(12) United States Patent
Mizukoshi et al.

(10) Patent No.: US 6,250,811 B1
(45) Date of Patent: Jun. 26, 2001

(54) TONE WHEEL BUILT IN CONSTANT VELOCITY JOINT

(75) Inventors: Yasumasa Mizukoshi; Yoshiaki Onose; Naoki Mitsue; Hideo Ouchi, all of Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/347,853

(22) Filed: Jul. 9, 1999

Related U.S. Application Data

(62) Division of application No. 09/154,448, filed on Sep. 16, 1998.

(30) Foreign Application Priority Data

Sep. 16, 1997 (JP) .................................................. H9-250597
Sep. 17, 1997 (JP) .................................................. H9-251844
May 18, 1998 (JP) ............................................. H10-134964

(51) Int. Cl.[7] .................................................... F16C 41/04
(52) U.S. Cl. ............................................................. 384/448
(58) Field of Search .................................. 384/544, 448; 324/207.25, 173, 174; 464/145, 139, 143, 906, 170, 173, 175; 301/105.1; 277/321, 634, 635, 636

(56) References Cited

U.S. PATENT DOCUMENTS

| | | | |
|---|---|---|---|
| 4,424,047 | * 1/1984 | Welschof et al. | 384/544 X |
| 4,427,085 | * 1/1984 | Aucktor | 384/544 X |
| 4,493,676 | * 1/1985 | Krude | 464/145 X |
| 4,798,560 | * 1/1989 | Farrell | 384/544 X |
| 4,946,295 | * 8/1990 | Hajzler | 384/448 |
| 4,948,277 | * 8/1990 | Alff | 384/448 X |
| 5,046,867 | * 9/1991 | Hilby et al. | 384/448 |
| 5,156,571 | * 10/1992 | Kapaan et al. | 464/143 |
| 5,575,568 | * 11/1996 | Rigaux et al. | 384/448 |
| 5,674,011 | 10/1997 | Hofmann et al. | |
| 5,707,066 | * 1/1998 | Sugiura et al. | 464/175 X |
| 5,762,425 | * 6/1998 | Ouchi | 384/448 |
| 5,852,361 | * 12/1998 | Ouchi et al. | 384/448 X |

FOREIGN PATENT DOCUMENTS

| | | |
|---|---|---|
| 3703395 A1 | 8/1988 | (DE) . |
| 8717505 | 3/1989 | (DE) . |
| 4425732 A1 | 1/1996 | (DE) . |
| 0 317 423 A1 | 5/1989 | (EP) . |
| 2 303 214 | 2/1997 | (GB) . |

* cited by examiner

*Primary Examiner*—David A. Bucci
*Assistant Examiner*—Colby Hansen
(74) *Attorney, Agent, or Firm*—Crowell & Moring, L.L.P.

(57) ABSTRACT

A rolling bearing unit has a hub which is formed with a housing for partly forming a constant velocity joint, wherein a connecting tube 20 of a magnetic metal plate is provided to have a base half portion 21 fitted onto the opening portion of the housing and a tip half portion 22 projecting from the housing, and a number of through holes 26 are formed in an axial portion of the base half portion and arranged circumferentially to function as a tone wheel.

2 Claims, 9 Drawing Sheets

US 6,250,811 B1

TONE WHEEL BUILT IN CONSTANT VELOCITY JOINT

This application is a division of application Ser. No. 09/154,448, filed Sep. 16, 1998.

FIELD OF THE INVENTION

The present invention relates to a tone wheel built-in constant velocity joint for transmitting rotational force to a driven wheel such as the rear wheel of the FR vehicle (front engine rear wheel drive vehicle) or the RR vehicle (rear engine rear wheel drive vehicle), the front wheel of the FF vehicle (front engine front wheel drive vehicle), and the whole wheels of the 4WD vehicle (four wheel drive vehicle), while detecting the rotational speed of the driven wheel.

BACKGROUND OF THE INVENTION

The constant velocity joint is used to transmit the rotational force taken out of the engine through the transmission.

JP Patent Publication KOKAI NO. H7-317754 discloses a conventional rolling bearing unit for vehicle wheel having a constant velocity joint, where the constant velocity joint is combined with the rolling bearing unit, so that the driven wheel is rotatably supported by the suspension while the rotational force is transmitted to the driven wheel.

FIG. 8 shows the conventional structure disclosed in this publication. An outer ring or race 1 is supported by the suspension so as not to rotate when incorporated in the vehicle, and formed with a first mount flange 2 on its outer peripheral surface to be supported by the suspension and with outer ring raceways 3 in double rows on its inner peripheral surface. A hub 4 is provided on the radially inside of the outer ring 1, and formed with a second mount flange 5 on its outer peripheral surface at the axially outer end (left end in the drawings) to support a vehicle wheel (not shown), with inner ring raceways 6 in double rows on its outer peripheral surface at the axially middle portion, and with a housing 8 for the constant velocity joint 7 at the axially inner end (right end in the drawings). A plurality of rolling members 9 are provided between the outer ring raceways 3 and the inner ring raceways 6 to rotatably support the hub 4 inside the outer ring 1.

The terms "axially outer" and "axially outside" mean the widthwise outside when installed in the vehicle while the terms "axially inner" and "axially inside" mean the widthwise inside when installed in the vehicle in the present specification.

Substantially cylindrical covers 10 made of a metal plate such as stainless steel and annular seal rings 11 made of elastic member such as elastomer e,g. rubber are provided between the opposite opening portions of the outer ring 1 and the outer peripheral surface at the middle portion of the hub 4. The covers 10 and seal rings 11 isolate the portion where the rolling members 9 are located, from outside, and prevent the grease in this portion from leaking out to the outside, and the foreign matter such as rain water, dust from entering this portion.

The constant velocity joint 7 comprises, in addition to the housing 8, an inner ring or inner joint member 12 and balls 13, which are a rotation or torque transmitting member, respectively. The balls 13 are rotatably supported by a cage 14. Engaged in a spline joint with the inside of the inner ring 12 is the end of the drive shaft (not shown) which is rotated through the transmission by the engine.

Formed on the outer peripheral surface of the inner ring 12 are a plurality of (e.g. six) inner engagement grooves 15 in arcuate cross section which are circumferentially arranged with a uniform interval to extend at right angles with reference to the circumferential direction.

Formed on the inner peripheral surface of the housing 8 facing the inner engagement grooves 15 are a plurality of outer engagement grooves 16 in arcuate cross section which are circumferentially arranged to extend at right angles with reference to the circumferential direction.

The balls 13 can roll along the inner and outer engagement grooves 15, 16 when supported by the pockets 17 of the cage 14, respectively.

When installing into the vehicle the rolling bearing unit integral with the constant velocity joint as constructed above, the outer ring 1 is supported by the suspension through the first mount flange 2 while for example the front wheel, that is a driven wheel, is connected to the hub 4 through the second mount flange 5. The end portion of the drive shaft (not shown) is engaged in a spline joint with the inside of the inner ring 12 of the constant velocity joint to be rotatably driven by the engine through the transmission.

When the vehicle is moving, the rotation of the inner ring 12 is transmitted to the hub 4 through the balls 13 to rotate the driven wheel, e.g. front wheel.

There is a problem that the conventional rolling bearing unit for vehicle wheel as shown in FIG. 8 is hard to make the unit compact and lightweight. The reason is as follows;

In the constant velocity joint 7 integrally combined with the rolling bearing unit, six inner engagement grooves 15, six outer engagement grooves 16 and six balls 13 are used. In this case, in order to transmit the required torque keeping the rolling fatigue life of the inner engagement grooves 15 and outer engagement grooves 16 and of the rolling contact surfaces of the balls 13 of the constant velocity joint, the outer diameter of the balls 13 of the constant velocity joint 7 must be large in a degree. Accordingly, in the conventional rolling bearing unit for the vehicle wheel, the diameter of the circumscribing circle of the outer engagement grooves 16 determined by the size of the diameter of the circumscribing circle of the balls 13 is larger than the diameter of the inner ring raceways 6 on the outer peripheral surface at the middle portion of the hub 4.

Therefore, in the conventional rolling bearing unit for the vehicle wheel, the rolling bearing section comprising the outer ring 1, hub 4 and rolling members 9 and the section of the constant velocity joint 7 are arranged in series in the axial direction as shown in FIG. 8. However, in this series arrangement, the whole axial size of the rolling bearing unit for the vehicle wheel is larger, and by that amount, the whole apparatus weight is larger. The weight increase of the rolling bearing unit increases the unspring weight of the vehicle, which would worsen the ride comfortability and fuel consumption performance. Therefore, making the rolling bearing unit for the vehicle wheel compact and lightweight is required.

Under such a situation, the present inventors invented the rolling bearing unit for the vehicle wheel combined with the constant velocity joint disclosed in JP Patent Application No. H9-191433.

In the rolling bearing unit for the vehicle wheel combined with the constant velocity joint of this patent application, as shown in FIG. 9, the number of the inner engagement grooves 15 on the outer peripheral surface of the inner ring or inner joint member 12, the outer engagement grooves 16 on the inner peripheral surface of the housing 8a of the constant velocity joint 7a, which is provided on the axially inner end of the hub 4a, and the balls 13 between the inner and outer engagement grooves 15 and 16 are seven or more (e.g. 8–12), respectively, so that the load applied to the balls 13 during use of the rolling bearing unit is smaller than in the conventional structure. By that amount, the outer diameter of the balls 13 is made smaller, so that the diameter of the circumscribing circle of the balls 13 arranged in an annular shape, and the diameter of the circumscribing circle of the outer engagement grooves 16 are made smaller than the diameter of at least the axially inside one of the inner ring raceways 6 which are formed on the outer peripheral surface of the middle portion of the hub 4a. In addition, the axially inside one of the inner ring raceways 6 is made to overlap part (the left part in FIG. 9) of the outer engagement grooves 16 in the radial direction.

The operation to rotatably support the vehicle wheel to the suspension by the rolling bearing unit of this application is substantially the same to that of the conventional rolling bearing unit as mentioned above.

Particularly, in the case of the rolling bearing unit of this patent application, the diameter of the circumscribing circle of the outer engagement grooves 16 is smaller than the diameter of the axially inside one of the inner ring raceways 6, so that this inner ring raceway 6 is made to radially overlap part of the outer engagement grooves 16. Accordingly, by this overlap amount, the axial size of the rolling bearing unit for the vehicle wheel is made smaller so as to make the whole apparatus compact and lightweight.

However, it is difficult to incorporate in the structure of FIG. 9 the tone wheel for detecting the rotational speed of the vehicle wheel. Specifically, detecting the rotational speed of the vehicle wheel is required to control the antilock brake system (ABS) and the traction control system (TCS). And, the tone wheel with the circumferential property changed alternately with a uniform interval must be fixedly supported on the inside of the first mount flange 2 on part of the hub 4a rotating with the vehicle wheel in order to detect the rotational speed.

However, in the case of the patent application of FIG. 9, the inner ring raceway 6 on the axially inside is made to radially overlap part of the outer engagement grooves 16 to reduce the axial size of the rolling bearing unit, which reduces the axial size $L_{18}$ of the axially inner end portion 18 axially inwardly projecting from the seal ring 11 at the axially inner end of the housing 8a adjacent the axially inner end portion of the hub 4a.

Fitted onto the axially inner end portion 18 is the axially outer end portion of the boot (not shown) which shields the interior of the housing 8a from outside to prevent the foreign matter from entering the housing 8a while preventing the grease in the housing 8a from leaking out. In addition, the axially outer end of the boot must be retained on the outer peripheral surface at the axially inner end portion of the housing 8a with a retaining band (not shown). For the rolling bearing unit combined with the constant velocity joint improved as shown in FIG. 9, the space for incorporating the tone wheel is not available so long as any modification is made.

SUMMARY OF THE INVENTION

Under such situation, an object of the present invention is to provide a constant velocity joint wherein a tone wheel can be incorporated in it to detect the rotational speed of the vehicle wheel even if there is no space available to incorporate an independent tone wheel in the rolling bearing unit for the vehicle wheel integral with the constant velocity joint improved as mentioned above.

PREFERRED EMBODIMENTS OF THE PRESENT INVENTION

Figure 1:
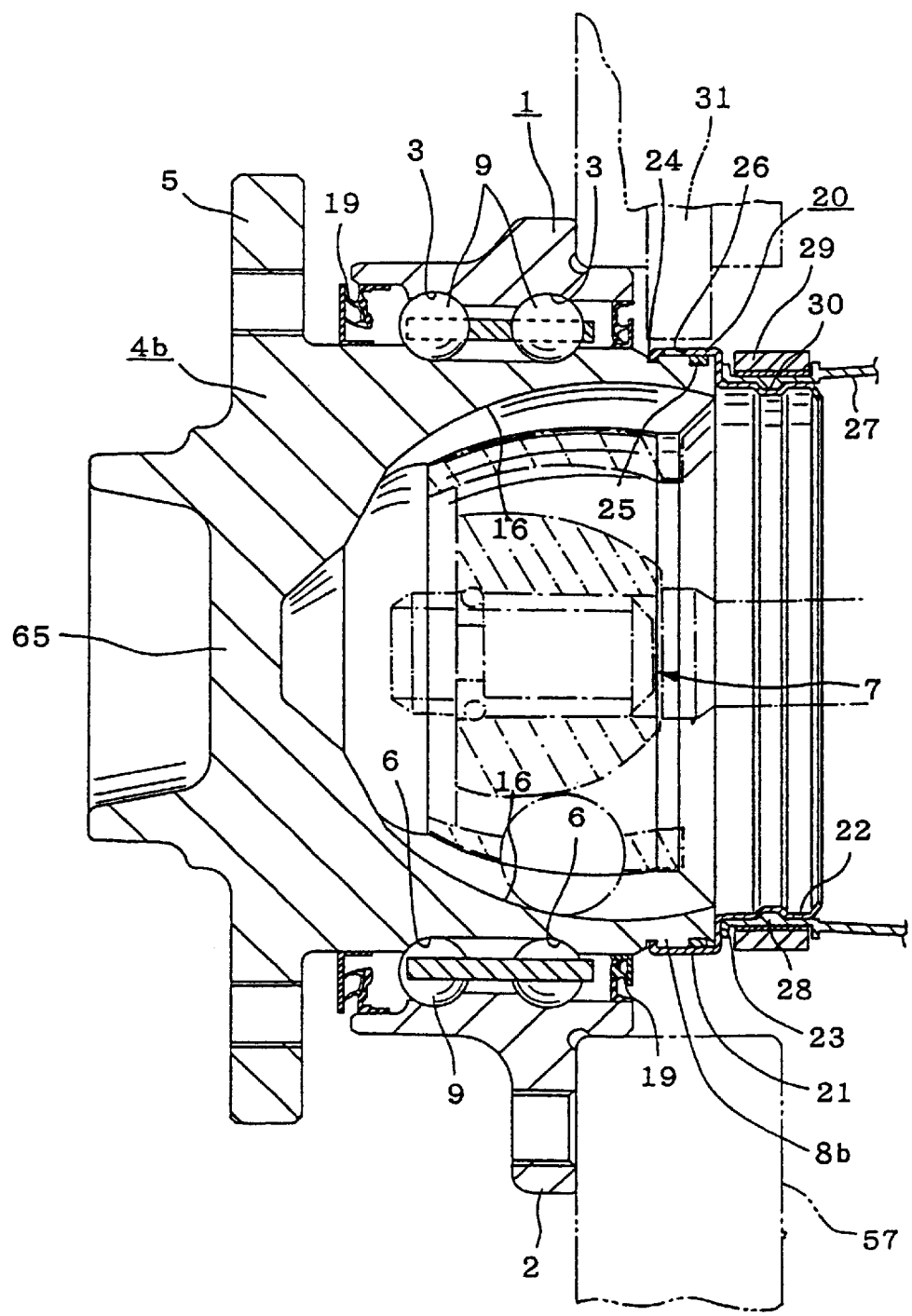
FIG. 1 is a cross sectional view of a first example of the embodiments of the constant velocity joint according to the present invention.

The tone wheel built-in constant velocity joint of the present invention comprises a housing having an inner peripheral surface formed with an axially long engagement grooves or recesses, a rotational shaft inserted into the interior of the housing, and a rotation or torque transmission member provided between the outer peripheral surface of the rotational shaft and the engagement grooves or recesses of the housing.

The tone wheel built-in constant velocity joint in a first feature is equipped with a connecting tube having a base half portion fixedly fitted onto the opening end portion of the housing and a tip half portion axially projecting from the opening end face of the housing, and a boot made of a resilient material and having one end fixedly fitted onto the tip end portion of the connecting tube. In addition, the connecting tube has a detected portion to be the tone wheel having a circumferential property alternately changing with a uniform interval.

The tone wheel built-in constant velocity joint in a second feature is equipped with a connecting tube fixedly fitted onto the opening end portion of the housing, and a boot made of a resilient material and having one end fixedly fitted onto part of the connecting tube. In addition, the connecting tube has another part projecting from the boot, and the another part is provided with a detected portion for the tone wheel having a circumferential property alternately changing with a uniform interval.

The tone wheel built-in constant velocity joint in a third feature is equipped with an inner ring fixedly fitted onto the middle portion of the housing to partly form the rolling bearing unit, and a boot made of a resilient material and having one end fixedly fitted onto an end portion of the housing, the housing having an anchoring groove on the outer peripheral surface thereof axially between the end edge portion of the boot and the inner ring, a stop ring engaged with the anchoring groove to prevent the inner ring from being displaced with reference to the housing, and a retaining ring fixedly fitted onto the stop ring, and part of the retaining ring having a detected portion to be the tone wheel having a circumferential property alternately changing with a uniform interval.

The tone wheel built-in constant velocity joint in a fourth feature is equipped with an inner ring fixedly fitted onto the middle portion of the housing to partly form the rolling bearing unit, and a boot made of a resilient material and having one end fixedly fitted onto an end portion of the housing, the housing having an anchoring groove on the outer peripheral surface thereof axially between the end edge portion of the boot and the inner ring, a stop ring engaged with the anchoring groove to prevent the inner ring from being displaced with reference to the housing, and a tone wheel being integral with the housing or fixedly connected directly or through another member to part of the housing to rotate with the housing, and the tone wheel formed with a portion to be a detected portion having a circumferential property alternately changing with a uniform interval and the portion placed in the space surrounded by the outer peripheral surface of the stop ring, the outer peripheral surface of the boot, the inner peripheral surface of the mount hole in the knuckle for fixing the outer ring of the rolling bearing unit.

In operation, since e.g. the connecting tube for connecting one end of the boot to the opening end portion of the housing, or the retaining ring for fixing the stop ring to the housing are used as a tone wheel in the tone wheel built-in constant velocity joint of the present invention constructed as mentioned above, there is no need of the space for an independent tone wheel to be incorporated therein. Accordingly, even if no space is available for an independent tone wheel to be incorporated therein, it is possible to detect the rotational speed of the vehicle wheel. In addition, the connecting tube or the retaining ring takes the role of the tone wheel, the number of parts is not increased, and there in no cost increase of the constant velocity joint due to the tone wheel incorporated therein.

Now, embodiments of the present invention are explained with reference to the drawings.

FIG. 1 shows a first example of the embodiments of the present invention corresponding to the first feature.

The outer ring 1 is made of a metal member such as carbon steel and formed in a single piece through a forging process and being supported by the suspension so as not to be rotated during use. Specifically, the outer ring 1 has an outer peripheral surface formed with a first mount flange 2 to be supported by the suspension and an inner peripheral surface formed with outer ring raceways 3 in double rows.

The hub 4b is provided on the radially inside of the outer ring 1 and made of a metal member formed in a single piece through a forging process. Specifically, the hub 4b has an outer peripheral surface which is, at its axially outer end, formed with a second mount flange 5 to support a vehicle wheel and, at its middle portion, inner ring raceways 6 in double rows. The inner half portion of the hub 4 forms a housing 8b for the constant velocity joint 7. A plurality of rolling members 9 are provided between the outer ring raceways 3 and the inner ring raceways 6 to rotatably support the hub 4b inside the outer ring 1.

Provided between the inner peripheral surface at either end of the outer ring 1 and the outer peripheral surface at the middle portion of the hub 4b is a seal ring assembly 19 which comprises a slinger and a seal ring to isolate from the outside the portion where the rolling members 9 are located and to prevent the grease from the portion to the outside and to prevent the foreign matter such as rain water, dust from entering the portion from the outside.

The constant velocity joint 7 is equipped, in addition to the housing 8b, with an inner ring or inner joint member 12 and a plurality of balls (see FIG. 2, FIGS. 4 to 9, omitted in FIG. 1), which are a rotation or torque transmission member, respectively. The balls 13 are reciprocatively rotatably supported in the cage 14 (FIGS. 2, 4, 5, 8 and 9). Engaged with the inside of the inner ring 12 through a spline joint is an end of the driving shaft (not shown) which is rotatably driven by the engine through the transmission. Formed on the outer peripheral surface of the inner ring or inner joint member 12 are a plurality (e.g. eight) of inner engagement grooves 15 (FIGS. 2, 4, 5, 8 and 9) which has an arcuate shape in cross section and are arranged circumferentially with a uniform interval, each extending in an orthogonal direction to the circumferential direction.

At the portion on the inner peripheral surface of the housing 8b facing the inner engagement grooves 15, outer engagement grooves 16 in arcuate shape in cross section extend in an orthogonal direction to the circumferential direction, respectively. The balls 13 are held in the pockets 17 (FIGS. 2, 4, 5, 8 and 9) of the cage 14, respectively, and in this state, rotatable along the inner and outer engagement grooves 15, 16.

Fitted onto the opening portion at the axially inner end of the hub 4b integral with the housing 8b is the base half portion 21 of the connecting tube 20 which is made of a magnetic metal plate having corrosion resistance, such as stainless steel, e.g. SUS 430, galvanized plate steel plate. The connecting tube 20 is generally formed in a cylindrical shape with a crank shape in cross section, wherein the base half portion 21, larger in diameter, is connected to the tip half portion 22, smaller in diameter, through the step portion 23. When the step portion 23 of the connecting tube 20 is abutted to the axially inner end face of the hub 4b, the tip end edge of the base half portion 21 is fixed to the axially inner end of the hub 4b, specifically in the anchoring groove 24 formed on an outer peripheral surface portion of the hub 4b closer to axially its inner end, by way of crimping such as rolling processing.

Provided between the inner peripheral surface of the base half portion 21 and the outer peripheral surface at the axially inner end of the hub 4b is an O-ring 25 which prevents the rain water etc. from entering the housing 8b through between the peripheral surfaces.

In the state of incorporation into a vehicle, the axially outer end portion of the boot 27 is fitted onto the tip half portion 22 of the connecting tube 20 for being dust tight and water tight.

The boot 27 is made in a single piece by an resilient member such as elastomer e.g. rubber, synthetic resin, and comprises an intermediate bellows portion, and opposite cylindrical end portions. The axially outer end portion of the boot 27 forms a connecting tube portion 28.

The connecting tube portion 28 provided on the axially outer end of the boot 27 is fitted onto the tip half portion 22 of the connecting tube 20, and the outer peripheral surface of the axially outer end of the boot 27 is retained by the retaining band 29.

Provided on the outer peripheral surface of the middle portion of the tip half portion 22 is a groove 30 or projection for engagement with the inner peripheral surface of the connecting tube portion 28 of the boot 27 to prevent the outer end portion of the boot 27 from being taken out from the tip half portion 22.

Formed on an axial portion of the base half portion 21 of the connecting tube 20, closer to the axially outside than the portion facing the O-ring 25, are a number of slit-shaped through holes 26 which are long in the axial direction, and arranged circumferentially with a uniform interval to be used as a detected portion.

The magnetic property of the axial portion, that is the detected portion, of the base halfportion 21 changes circumferentially alternately with a uniform interval. Thus, in the rolling bearing unit integral with the tone wheel built-in constant velocity joint, the axial portion of the base half portion 21 formed with the through holes 26 is used as the tone wheel.

When incorporating the rolling bearing unit integral with the tone wheel built-in constant velocity joint for the vehicle wheel, the outer ring 1 is supported to the suspension through the first mount flange 2, and the driven wheel, e.g. front wheel, is connected to the hub 4b through the second mount flange 5. The tip end of the driving shaft (not shown), rotatably driven through the transmission by the engine, is connected to the interior of the inner ring 12 of the constant velocity joint with a spline engagement. When the vehicle is moved, the rotation of the inner ring 12 is transmitted to the hub 4b through the balls 13 to rotate the front wheel.

The sensor 31 is supported by the fixed portion such as the knuckle 57 of the suspension and formed with a detecting portion on its tip end, which faces through a clearance the outer peripheral portion of the axial portion with the through holes 26 of the base half portion 21. When moving the vehicle, as the hub 4b rotates, the through holes 26 and the column portions of magnetic material between the circumferentially adjacent through holes 26 alternately pass by the detecting portion of the sensor 31. Consequently, the amount of magnetic flux through the sensor 31 changes, and the output of the sensor 31 changes. The frequency at which the output of the sensor 31 changes is proportional to the rotational speed of the hub 4b, and by sending the output of the sensor 31 to a control device (not shown), the rotational speed of the hub 4b rotating with the vehicle wheel is obtained to control the ABS and TCS.

In the rolling bearing unit integral with the tone wheel built-in constant velocity joint, the axially outer end of the boot 27 is connected to the opening portion of the axially inner end of the housing 8b in the axially inner half portion of the hub 4b by way of the connecting tube 20 which is used as the tone wheel, so that no space is required to incorporate an independent tone wheel. Accordingly, it is possible to detect the rotational speed of the vehicle wheel even if there is no space secured to incorporate the independent tone wheel.

In addition, since the connecting tube 20 takes the role of the tone wheel, the number of parts, and the cost of the rolling bearing unit are not increased by combining it with the tone wheel built-in constant velocity joint.

Figure 2:
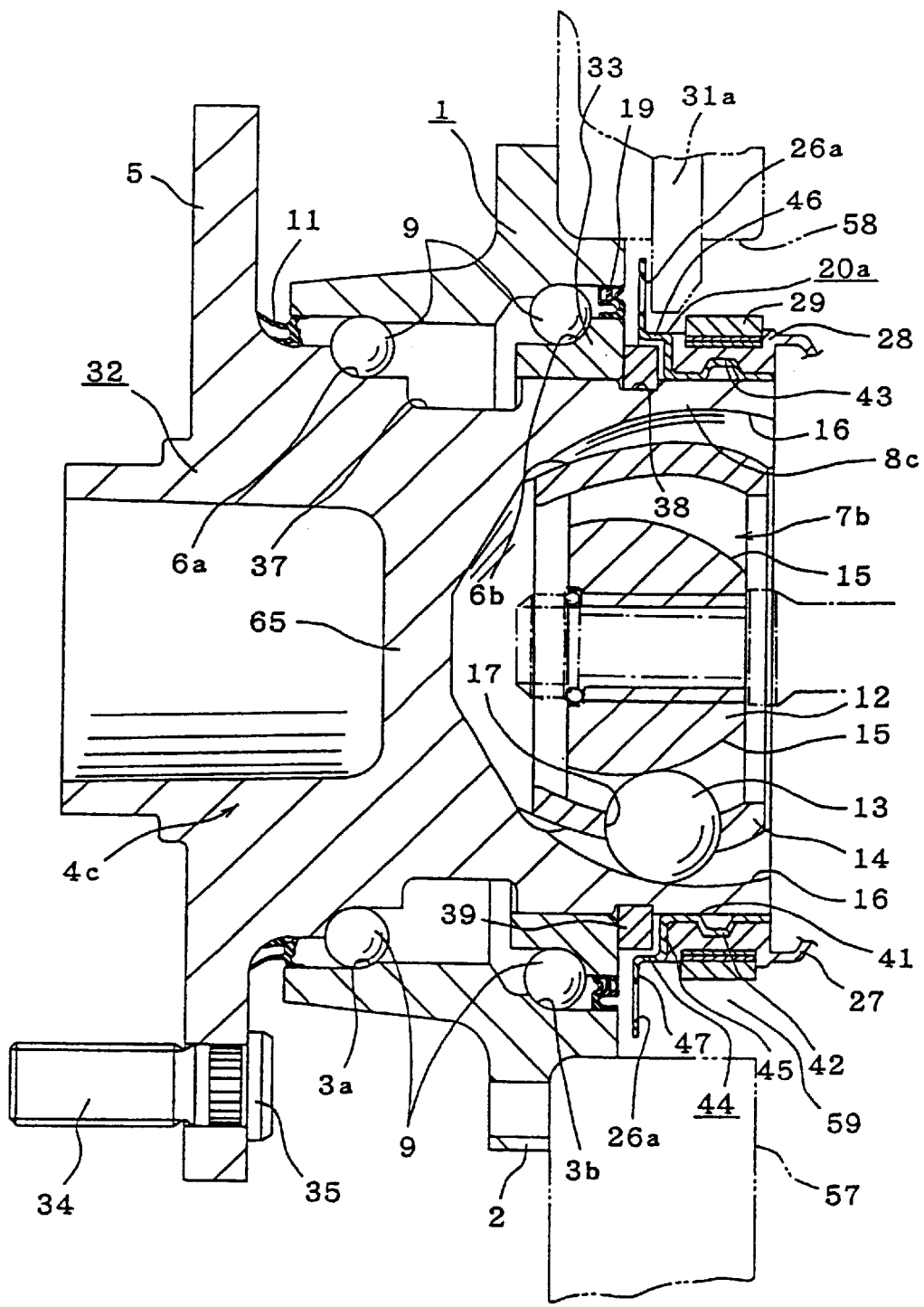
FIG. 2 is a cross sectional view of a second example of the embodiments of the constant velocity joint according to the present invention.

FIG. 2 shows a second example of the embodiments of the present invention corresponding to the second and fourth features.

The outer ring 1 has an inner peripheral surface which is formed with the outer ring raceways 3a, 3b in double rows, and the hub 4c is provided on the inner diameter side of the outer ring 1. The hub 4c comprises a hub element 32 and an inner ring 33 fitted on the hub element 32 in a concentric relationship with the outer ring 1. Inner ring raceways 6a, 6b are disposed on the outer peripheral surface of the hub 4c at a portion facing the outer ring raceways 3a, 3b.

The inner ring raceway 6a on the axially outer side (left side in FIG. 2) is directly formed on the outer peripheral surface at the middle portion of the hub element 32.

The inner ring 33 is fitted onto a portion of the middle portion of the hub element 32 closer to the axially inner end (right side in FIG. 2) than the inner ring raceway 6a on the axially outer side. The inner ring raceway 6b on the axially inner side (right side in FIG. 2) is formed on the outer peripheral surface of the inner ring 33.

The rolling members 9 are rotatably provided between the outer ring raceways 3a, 3b and the inner ring raceways 6a, 6b to rotatably support the hub 4c on the radially inside of the outer ring 1.

In the example illustrated, since the inner ring raceway 6a on the axially outer side is directly formed on the outer peripheral surface of the hub element 32, the diameter of the inner ring raceway 6a on the axially outer side is smaller than the diameter of the inner ring raceway 6b on the axially inner side formed on the outer peripheral surface of the inner ring 33.

In addition, since the diameter of the inner ring raceways 6a on the axially outer side is smaller than the diameter of the inner ring raceway 6b on the axially inner side, the diameter of the outer ring raceway 3a on the axially outer side facing the inner ring raceway 6a on the axially outer side is smaller than the diameter of the outer ring raceway 3b on the axially inner side.

The outer diameter of the outer half portion (left half portion in FIG. 2) with the outer ring raceway 3a of the outer ring 1 is smaller than the outer diameter of the inner half portion (right half portion in FIG. 2) with the outer ring raceway 3b of the outer ring 1.

In the example illustrated, since the diameters of the inner ring raceway 6a and outer ring raceway 3a on the axially outer side are made smaller, the number of rolling members 9 between the inner ring raceway 6a and the outer ring raceway 3a on the axially outer side is smaller than the number of rolling members 9 between the inner ring raceway 6b and the outer ring raceways 3b on the axially inner side.

Since the diameter of the pitch circle of the rolling members 9 in the axially outer row of rolling members is smaller, the outer diameter of the outer half portion of the outer ring 1 is smaller. By that amount, the diameter of the pitch circle of the studs 34 fixed to the second mount flange 5 on the outer peripheral surface of the hub element 32 is smaller. Accordingly, without increasing the axial size of the hub element 32, the outer diameter of the second mount flange 5 with the studs 34 fixed thereto is smaller, thereby effectively making the rolling bearing unit for the vehicle wheel lightweight and compact.

As the pitch circle diameter of the rolling members 9 in the axially outer row of rolling members is smaller than the pitch circle diameter of the rolling members 9 in the axially inner row of rolling members, the basic dynamic load rating of the axially outer row of rolling members is smaller than that of the axially inner row of rolling members. Accordingly, if the same load is applied to the both rows, the life of the axially outer row of rolling members is shorter than that of the axially inner row of rolling members.

Since the load applied to the axially outer row of rolling members is smaller than the load applied to the axially inner row of rolling members in generally used automobile. Accordingly, the design for substantially equalizing the both rows in life is easily achieved, excluding too short life of each part.

The second mount flange 5 for fixedly supporting the vehicle wheel with the hub element 32 is integrally provided on the outer peripheral surface of the axially outer end of the hub element 32. The studs 34 for securing the vehicle wheel have their base end portions fixed to the second mount flange 5. In the example illustrated, the pitch circle diameter of the studs 34 is made smaller by the amount that the outer diameter of the axially outer half portion of the outer ring 1 is smaller than the outer diameter of the axially inner half portion of the outer ring 1, preventing interference between the head 35 of the studs 34 and the outer peripheral surface of the axially outer end of the outer ring 1.

With the outer peripheral surface of the hub element 32, the diameter at a portion axially inner than the inner ring raceway 6a on the axially outer side is smaller than the diameter of the inscribing circle of the rolling elements 9 mating with the inner ring raceway 6a. This is because, upon assembling the rolling bearing unit, the hub element 32 can be inserted into the outer ring 1 in the state where the seal ring 11 is fixedly fitted into the inner peripheral surface of the axially outer end of the outer ring 1 while the rolling members 9 are incorporated on the inner diameter side of the outer ring raceway 3a on the axially outer end of the outer ring With the outer peripheral surface at the middle portion of the hub element 32, the portion between the inner ring raceway 6a on the axially outer side and the portion where the inner ring 33 is fitted, is formed with circumferentially a recessed groove portion 37 to reduce the weight of the hub element 32.

In order to prevent the inner ring 33 on the hub element 32 from moving toward the axially inner end, and in order to keep the preload at a proper value on the rolling members 9 provided rotatably between the outer ring raceways 3a, 3b and the first and second inner ring raceways 6a, 6b, the stop ring 39 is secured in the anchoring groove 38 circumferentially formed generally on the outer peripheral surface of the hub element 32 at a portion closer to the axially inner end.

The stop ring 39 comprises a pair of stop ring elements each formed in a semi circular shape.

The stop rings 39 have an inner peripheral edge portion engaged with the anchoring grooves 38 to provide the rolling members 9 with a proper preload, by pressing the inner ring 33 axially outward with reference to the hub element 32. In order that even when the force thus pressing the inner ring 33 is released, the proper preload is kept onto the rolling members 9, the stop ring 39 in a proper thickness is selected for use. Specifically, a various kinds of stop rings 39 with slightly different in thickness are prepared, and the stop ring 39 with the most proper thickness is selected with respect to the groove width etc. of the anchoring groove 38, dimensions of the parts of the rolling bearing unit, for engagement of the anchoring grooves 38. Accordingly, by engaging the stop ring 39 with the anchoring groove 38, after the pressing force is released, the inner ring 33 is prevented from moving toward the axially inner end, and the proper preload is kept to be applied to the rolling members 9.

In order to prevent the pair of stopping elements of the stop ring 39 from moving radially outward by centrifugal force and to prevent the stop ring 39 from being erroneously taken off from the anchoring groove 38, part of the connecting tube 20a is provided around the stop ring 39. The connecting tube 20a is provided to fittingly support the outer end of the boot 27 which is provided to prevent the foreign matter such as rain water, dust from entering the constant velocity joint 7b comprising the housing 8c on the axially inner end of the hub element 32. The outer end of the boot 27 is fitted onto the fitting tube portion 41 of the connecting tube 20a fixedly fitted onto the axially inner end of the hub element 32 through interference, and retained on the outer peripheral surface of the fitting tube portion 41 by the retaining band 29.

On the outer peripheral surface at the axially middle portion of the fitting tube portion 41, the engagement projection 42 is circumferentially formed, and engaged with the engagement groove 43 formed circumferentially on the inner peripheral surface of the outer end of the boot 27, so that the axially outer end of the boot 27 is prevented from being pulled out of the fitting tube portion 41.

The connecting tube 20a is made of a magnetic metal plate such as carbon steel e.g. SPCC, and formed through a drawing process in a generally annular shape with crank shaped cross section, and the surface is properly subjected to the corrosion prevention treatment.

The axially outer end of the fitting tube portion 41 has an edge portion with L-shaped cross section axially outwardly projected than the boot 27, to generally circumferentially form a retaining portion 44.

The retaining portion 44 comprises a circular ring portion 45 bent radially outward at the axially outer end edge of the fitting tube portion 41 and a retaining tube portion 46 bent axially outward at the outer peripheral edge of the circular ring portion 45. The axially outside surface of the circular ring portion 45 is placed in contact with or faced closely to the axially inside surface of the stop ring 39, and the inner peripheral surface of the retaining tube 46 is placed in contact with or faced closely to the outer peripheral surface of the stop ring 39.

On the axially outer end edge of the retaining tube 46, a radially outer circular ring portion 47 is formed to extend radially outward through a bent portion. A number of slit-shaped through holes 26a, each long in a diameter direction, are circumferentially formed with a uniform interval in the circular ring portion 47 such that the magnetic property of the circular ring portion 47 changes circumferentially alternately with a uniform interval to provide a detected portion finctioning as the tone wheel.

The detecting portion of the sensor 3a faces closely to the inside of the circular ring portion 47, and is supported by the stationary portion of the suspension.

In order that the magnetic property of the axially inside surface of the circular ring portion 47 changes alternately with the uniform interval, a permanent magnet such as rubber magnet can be used instead of the through holes 26a, such that the permanent magnet is attached to the axially inside surface of the circular ring portion 47 with the S-poles and N-poles alternately arranged circumferentially with a uniform interval.

In the example illustrated, the circular ring portion 47 for the detected portion functioning as the tone wheel, is disposed in the space 59 defined by the outer peripheral surface of the stop ring 39 and the outer peripheral surface of the connecting tube portion 28 at the end of the boot 27, the inner peripheral surface of the mount hole 58 of the knuckle 57 for fixing the outer ring 1 of the rolling bearing unit and the axially inner end surface of the outer ring 1, such that the circular ring portion 47 does not project from the space 59. Accordingly, the sensor 3a can be fixedly supported by the knuckle 57, and the limited space can be effectively utilized. The other structure and function are substantially the same to those of the first example. Therefore, redundant explanation is omitted, and like members are indicated by like reference numbers.

Figure 3:
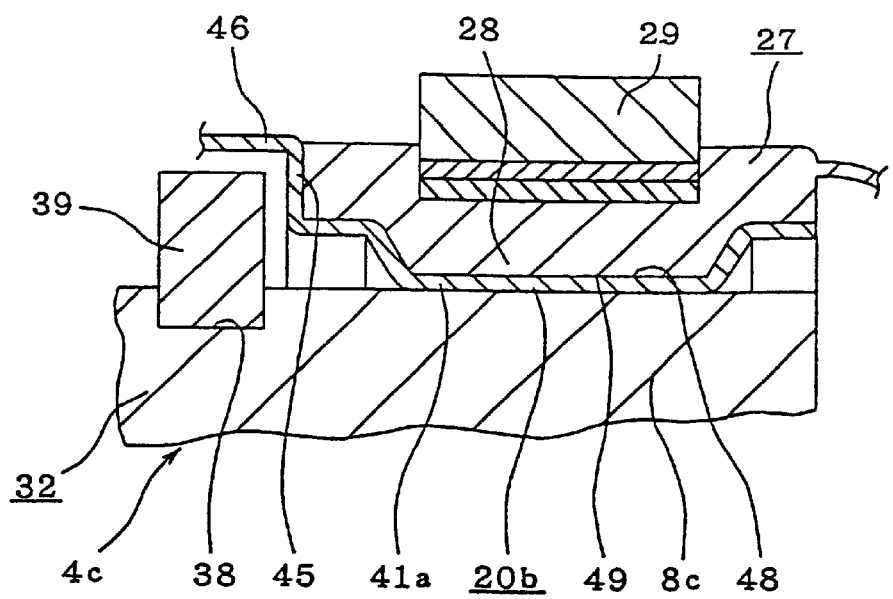
FIG. 3 is a cross sectional view of a third example of the embodiments of part of the constant velocity joint according to the present invention.

FIG. 3 shows a third example of the embodiment of the present invention corresponding to the second and fourth features, where an engagement groove 48 is formed in the axially middle portion of the outer peripheral surface of the fitting tube portion 41a of the connecting tube 20b.

The engagement groove 48 is engaged with the engagement projection 49 on the inner peripheral surface of the connecting tube portion 28 at the axially outer end of the boot 27 to prevent the connecting tube portion 28 of the boot 27 from being taken off from the fitting tube portion 41a. The other structure and function are substantially the same to those of the second example.

Figure 4:
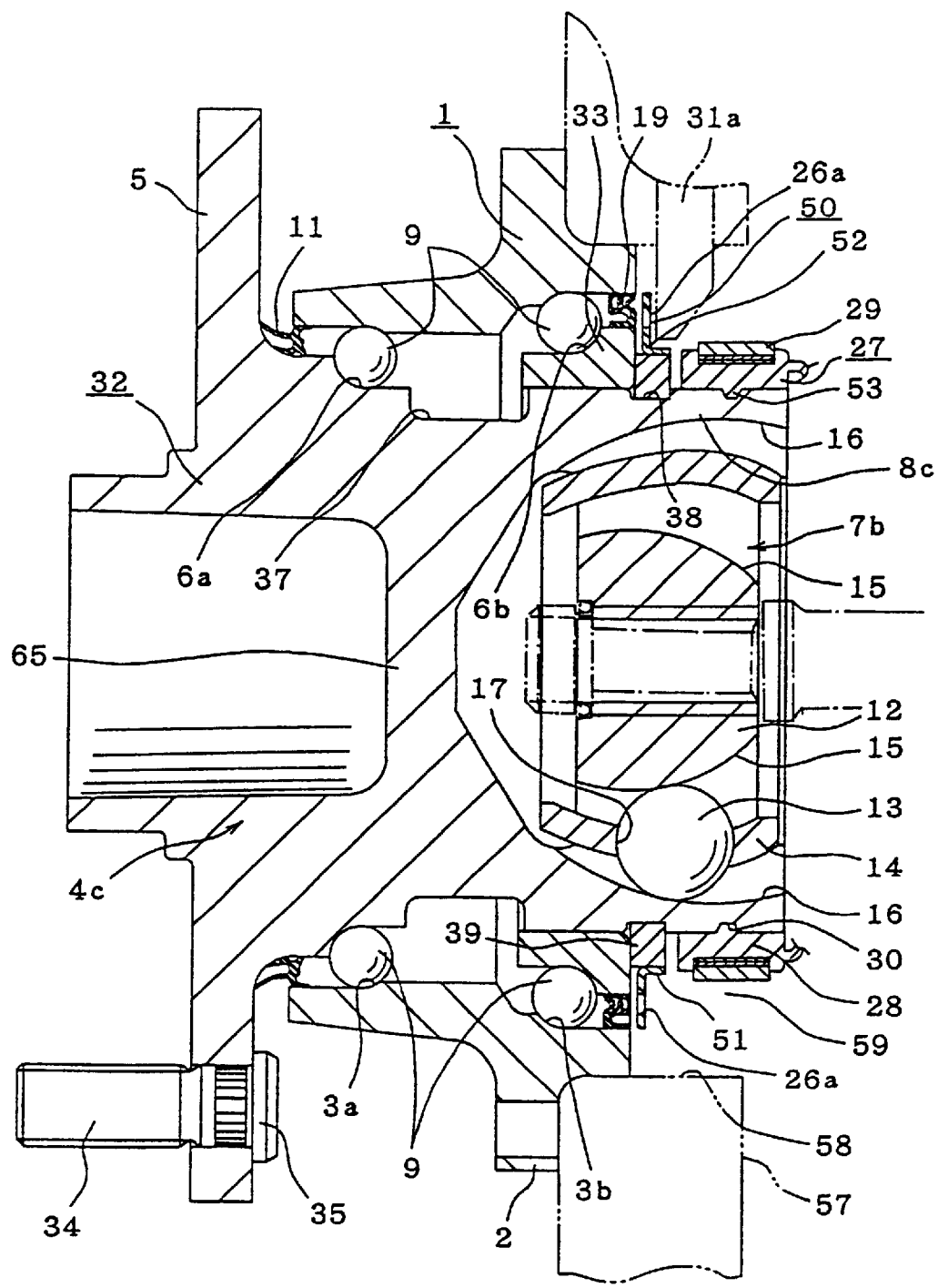
FIG. 4 is a cross sectional view of a fourth example of the embodiments of the constant velocity joint according to the present invention.

FIG. 4 illustrates a fourth example of the embodiments of the present invention corresponding to the third and fourth features, where a retaining ring 50 is fixedly fitted onto the stop ring 39 in the anchoring groove 38 of the hub element 32 through interference fit to form the hub 4c.

The retaining ring 50 is made of a magnetic metal plate such as carbon steel, e.g. SPCC, and formed through a burring process to comprise a fitting tube portion 51 and a circular ring portion 52 bent at one end edge of the fitting tube portion 51 at right angles radially outward, such that the retaining ring 50 is formed in an generally annular shape with L-shaped cross section, and its surface is subjected to corrosion prevention treatment. The fitting tube portion 51 is fixed onto the stop ring 39 through interference fit, so that the stop ring 39 comprising two halves is prevented from being taken off from the anchoring groove 38 and to support the retaining ring 50 with respect to the housing 8c.

On the other hand, the circular ring portion 52 is formed with a number of slit-shaped through holes 26a, each being long in a diametrical direction, circumferentially with a uniform interval, so that the magnetic property of the circular ring portion 52 changes circumferentially alternately with a uniform interval, and that the circular ring portion 52 is a detected portion finctioning as the tone wheel.

The sensor 3a is supported by the stationary portion such as knuckle 57 of the suspension, so that the detecting portion of the sensor 3a faces closely to the axially inside surface of the circular ring portion 52.

In the present example, the connecting tube portion 28 is formed on the axially outer end of the boot 27 to prevent the foreign matter from entering the constant velocity joint 7b, and directly fitted onto the axially inner end of the housing 8c.

In this condition, the projection 53 formed on the inner peripheral surface of the connecting tube portion 28 is engaged with the groove 30 formed on the outer peripheral surface at the axially inner end of the housing 8c to prevent the connecting tube portion 28 from being pulled off the housing 8c. The other structure and fimction are the same to those of the second example.

Figure 5:
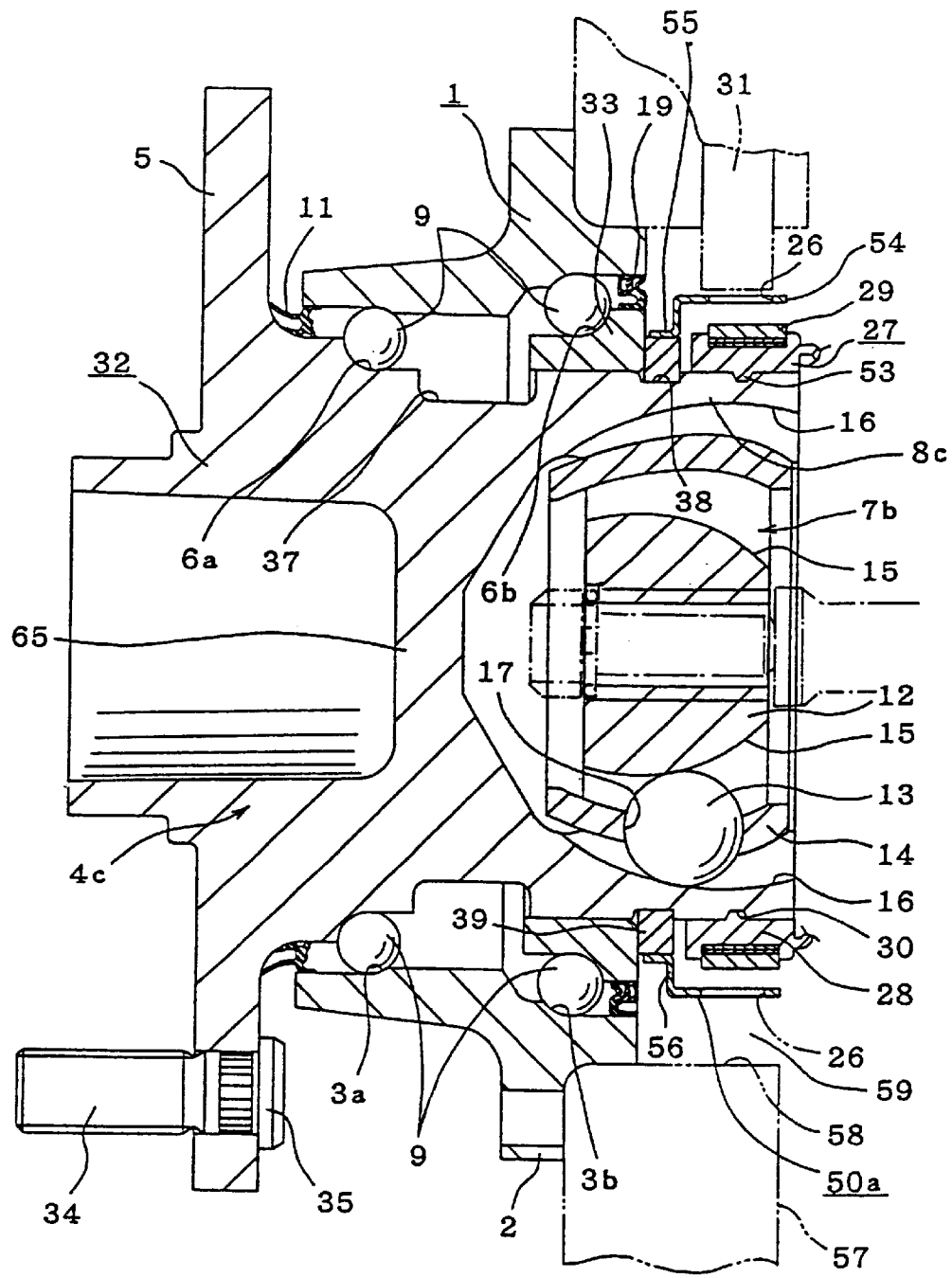
FIG. 5 is a cross sectional view of a fifth example of the embodiments of the constant velocity joint according to the present invention.

FIG. 5 shows a fifth example of the embodiments of the present invention corresponding to the third and fourth features, where the retaining ring 50a is formed in a crank shape in cross section and comprised of a larger cylindrical portion 54 and a smaller cylindrical portion 55 continued to the larger cylindrical portion 54 through a step portion 56 to prevent the stop ring 39 from being pulled off from the groove 38.

The smaller cylindrical portion 55 is fixedly fitted onto the stop ring 39 by way of interference fit, so that the stop ring 39 comprising two halves of stop ring elements is prevented from being pulled off from the groove 38, and to fixedly support the retaining ring 50a with reference to the housing 8c.

On the other hand, a number of slit-shaped through holes 26, each axially long (in the left and right directions in FIG. 5), are formed on the larger cylindrical portion 54 circumferentially with a uniform interval, so that the magnetic property of the larger cylindrical portion 54 changes circumferentially alternately with a uniform interval, so that the larger cylindrical portion 54 is a detected portion functioning as the tone wheel.

The sensor 31 is supported by the stationary portion such as knuckle 57 of the suspension, and the detecting portion of the sensor 31 faces closely to the outer peripheral surface of the larger cylindrical portion 54. The other structure and function are substantially the same to those of the fourth example.

Figure 6:
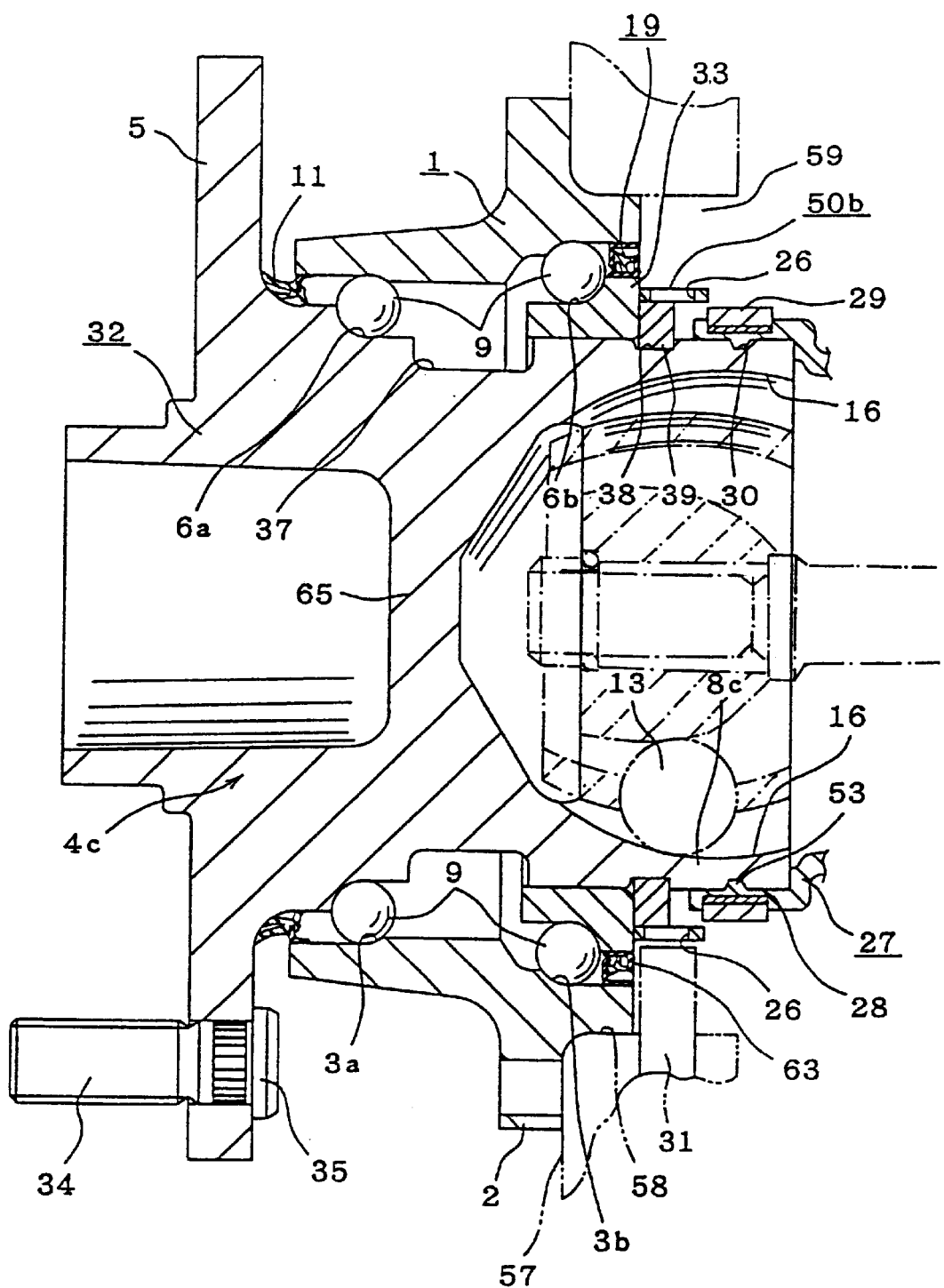
FIG. 6 is a cross sectional view of a sixth example of the embodiments of the constant velocity joint according to the present invention.

FIG. 6 shows a sixth example of the embodiments of the present invention corresponding to the third and fourth features, where the retaining ring 50b provided to prevent the stop ring 39 from being pulled off from the groove 38 is used as the cylindrical tone wheel. Specifically, the cylindrical retaining ring 50b is formed with a number of slit-shaped through holes 26, each axially long (in the left and right directions in FIG. 6), circumferentially alternately with a uniform interval, so that the outer peripheral surface of the retaining ring 50b is a detected portion functioning as the tone wheel. The sensor 31 is supported by the stationary portion such as knuckle 57 of the suspension, and the detecting portion of the sensor 31 faces closely to the outer peripheral surface of the retaining ring 50b. The other structure and function are substantially the same to those of the fifth example.

Figure 7:
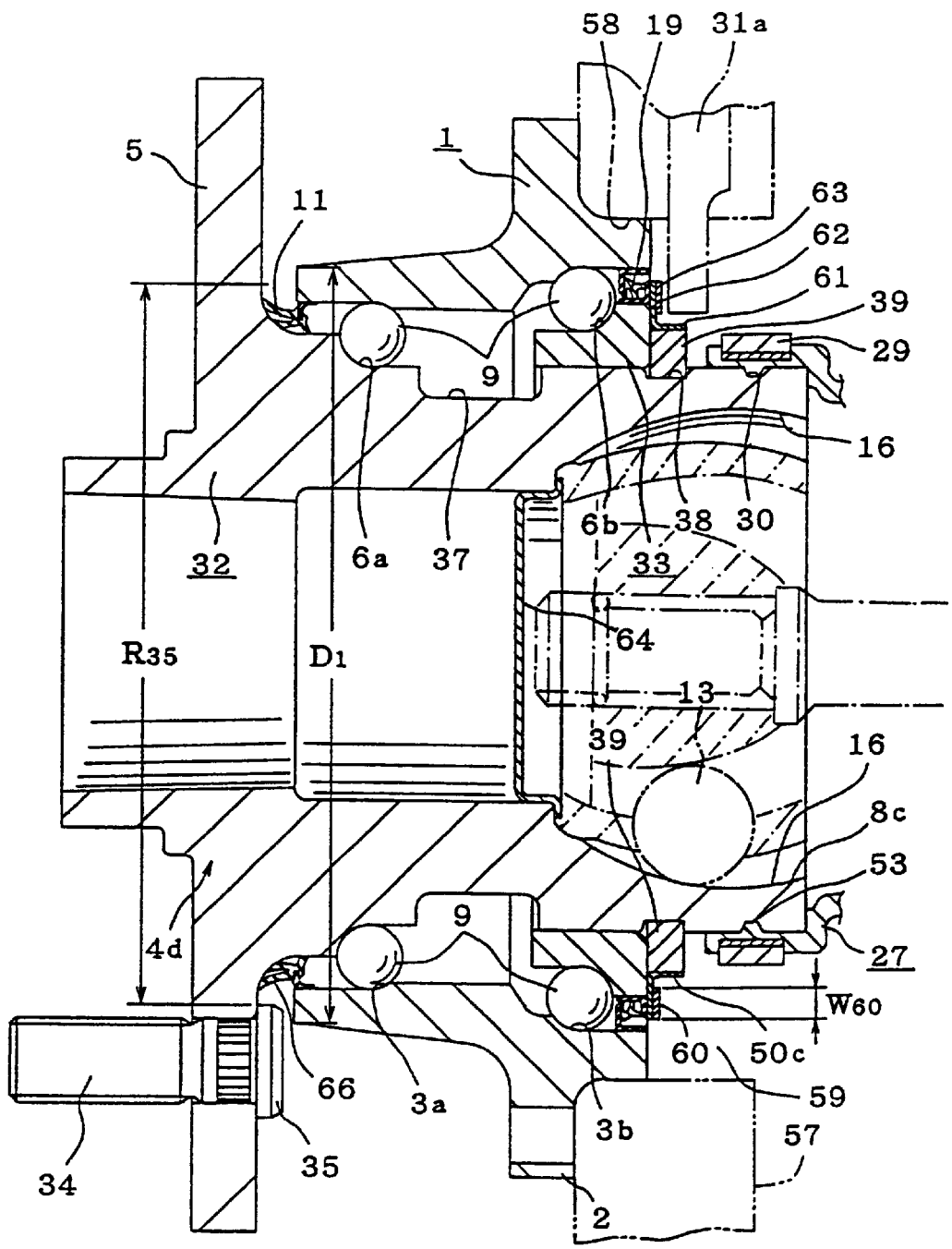
FIG. 7 is a cross sectional view of a seventh example of the embodiments of the constant velocity joint according to the present invention.

FIG. 7 shows a seventh example of the embodiments of the present invention corresponding to the third and fourth features, where the retaining ring 50c is provided to prevent the stop ring 39 from being pulled off from the groove 38, and the tone wheel 60 that is a circular ring shaped permanent magnet is attached to the retaining ring 50c, which is made of a magnetic metal plate and formed, through a burring process, in a generally annular shape with L-shaped cross section, and comprised of a cylindrical portion 61 and a circular ring portion 62 extending radially outward from the axially outer end of the cylindrical portion 61. The cylindrical portion 61 is fitted onto the stop ring 39 through interference fit, so that the retaining ring 50c is fixedly supported on the periphery of the stop ring 39, and that the stop ring 39 is prevented from being pulled off from the groove 38.

On the other hand, the tone wheel 60 is attached generally circumferentially to the axially inside surface of the circular ring portion 62 of the retaining ring 50c by way of seizure, adhesion, magnetic attraction force etc.

For example, the tone wheel 60 is made from a rubber magnet with ferrite powders mixed into rubber and axially magnetized (left and right directions in FIG. 7). The magnetizing directions are alternately changed with a uniform interval in the circumferential direction. Accordingly, N-poles and S-poles are alternately arranged in the circumferential direction with a uniform interval on the axially inside surface of the tone wheel 60.

The sensor 3a is provided in the knuckle 57 to project from the inner peripheral surface of the mount hole 58 for fixing the outer ring 1 of the rolling bearing unit, and the tip end of the sensor 3a is formed with the detecting portion, which faces the axially inside surface of the tone wheel 60 through a clearance in the axial direction so as to form the sensor unit to detect the rotational speed of the vehicle wheel which rotates with the hub 4d.

In order to secure the output of the sensor 31a, the height size $W_{60}$ in the diametrical direction of the tone wheel 60 is made larger to desirably increase the amount of magnetic flux from the tone wheel 60. In this example, the retaining ring 50c is fixedly fitted onto the stop ring 39 which is smaller in diameter than the inner ring 33, and therefore the height size $W_{60}$ is easily secured. Specifically, for example, the axially inside surface of the slinger 63 fixedly fitted onto the axially inner end of the inner ring 33 to form the seal ring assembly 19 can be used as the portion to support the annular tone wheel 60, and in the structure of the present example, the height size $W_{60}$ can be made larger comparing with the case where the slinger 63 is provided with the encoder. In addition, different from the case where the encoder is mounted to the slinger, the diameter of encoder can be freely made large. Since the diameter of encoder is proportional to the pole width in the circumferential direction, the pole width can be made larger by enlarging the diameter, so that the magnetic flux is increased.

In the present example, the hub 4d is formed in a hollow cylindrical shape to communicate the axial opposite ends with each other to make the rolling bearing unit for the vehicle wheel lightweight. The shield plate 64 is fixedly fitted into the inner peripheral surface at the middle portion of the hub 4b to isolate the communication between the axially inner end opening portion and the axially outer end opening portion of the hub 4d. The shield plate 64 prevents the foreign matter such as rain water and dust etc. on the outside from entering the constant velocity joint at the inner end of the hub 4d, and to prevent the grease in the constant velocity joint from leaking out to the outside. In order to effectively prevent the grease from moving from the required portion and to reduce the amount of grease to be filled in, the shield plate 64 is provided closer to the housing 8c of the constant velocity joint.

The shield plate 64 can be produced by press-forming a steel plate with the thickness of 1 mm or less, and therefore the hub 4d can be made more lightweight than in the case where the isolation wall 65 (FIGS. 1, 2, 4, 5 and 6) is integrally formed on the inner peripheral surface at the middle portion of the hub 4a which is produced by a forging process as in the first to sixth examples.

In addition, in the present example, the diameter $R_{35}$ of the inscribing circle of the heads 35 of the studs 34 to fixedly support the wheel with the second mount flange 5 is smaller than the diameter $D_1$ of the axially outer end of the outer ring 1 ($R_{35} < D_1$), so that the pitch circle diameter of the studs 34 is made as small as possible. In this case, the heads 35 do not interfere with the seal lip 66 of the seal ring 11 fixedly fitted into the axially outer end of the outer ring 1. In this example, the diameter of the axially outer end of the outer ring 1 is made smaller, the diameter of the seal lip 66 is made smaller, and therefore the diameter $R_{35}$ of the inscribing circle of the heads 35 of the studs 34 can be made smaller than in the conventional construction.

The other structure and function are substantially the same to those of the sixth example shown in FIG. 6.

Incidentally, omitted from the drawings, the outer peripheral shape of the heads of the studs can be formed in a semi-circle shape as in Letter D instead of the circular shape to reduce the pitch circle diameter of the studs.

In this case, the cut-out portion of the heads (the straight line portion of Letter D) is located on the radially inner side closer to the seal lip 66, so that even when the studs are located closer to the inner diameter side of the second mount flange 5, the heads do not interfere with the seal lip 66.

In all the examples mentioned above, the present application is applied to the constant velocity joint of the Pzeppe type or the Barfield type integral with the rolling bearing unit to rotatably support the vehicle wheel, the present invention, specifically, in the first and second features, can be applied to the tripod type constant velocity joint which is cut off from the rolling bearing unit and provided on the differential gear side.

Specifically, the connecting tube for connecting the boot end to the end portion of the housing of the tripod type constant velocity on the differential side can take part of the tone wheel. In this case, the rotation transmission member is the tripod and the three rollers supported by the tripod.

Figure 8:
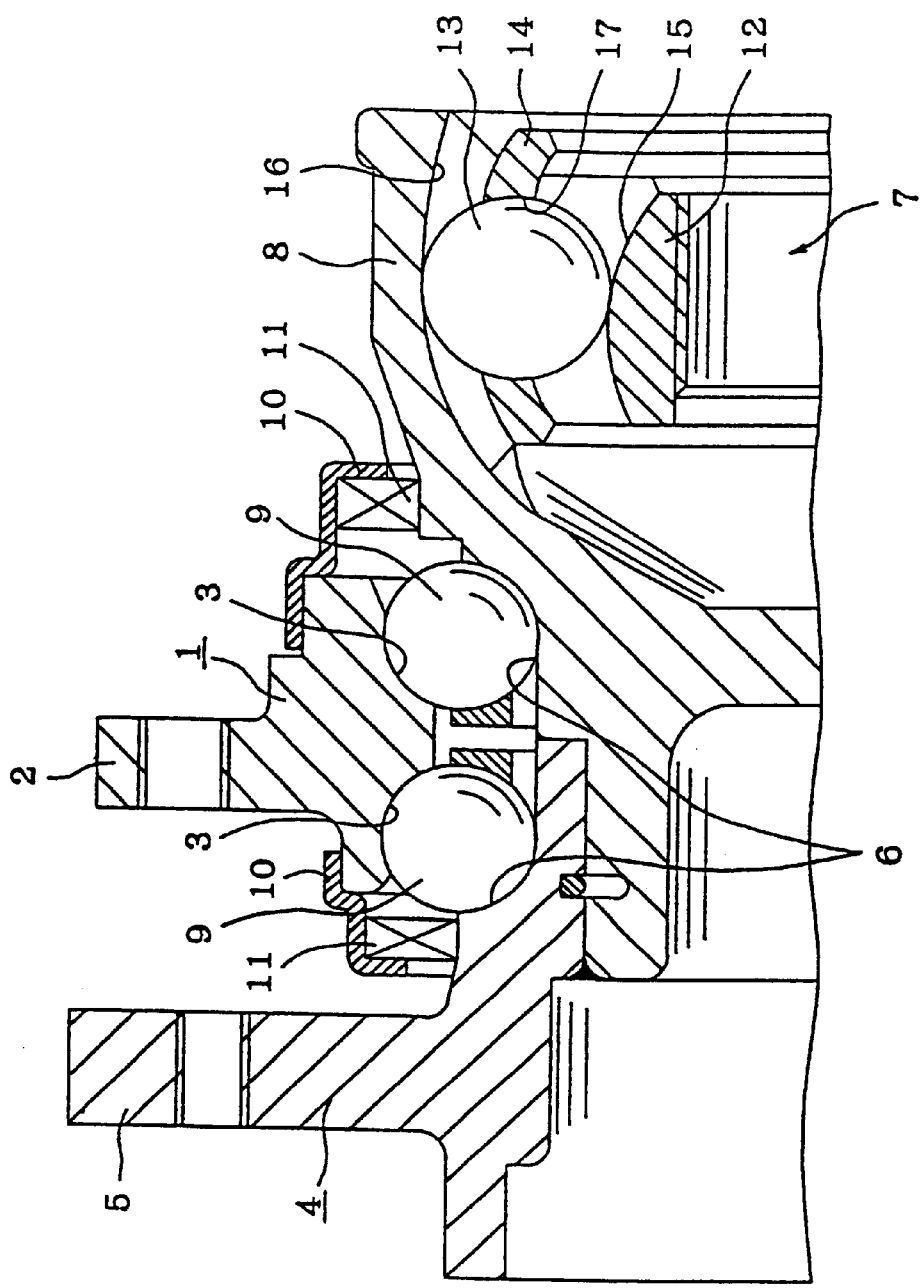
FIG. 8 is a cross sectional view of an example of the conventional structures.
Figure 9:
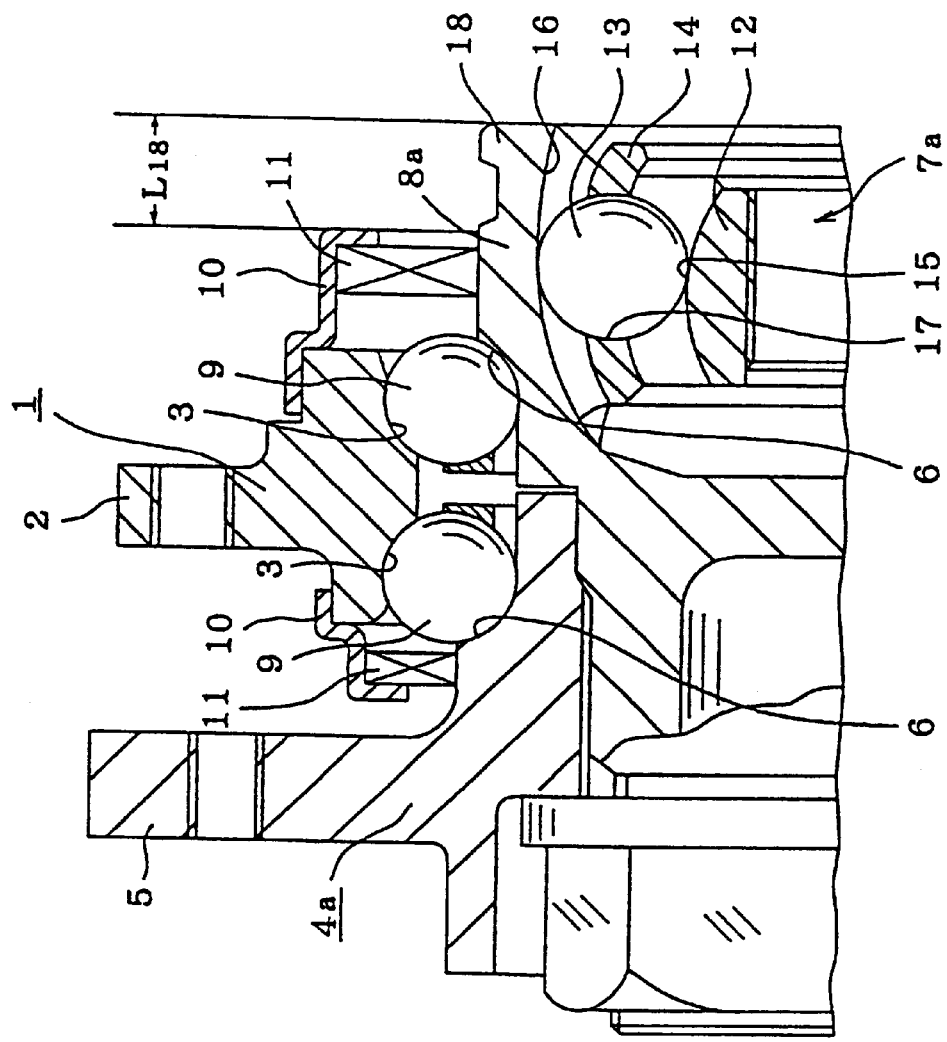
FIG. 9 is a cross sectional view of an example of the embodiments in JP Patent Application No. H9-191433.

When combining the constant velocity joint with the rolling bearing unit, the structure of the rolling bearing unit is not limited to the illustrated examples, and can be applied to various constructions including those of FIGS. 8 and 9.

The tone wheel built-in constant velocity joint of the present invention constructed and functioning as mentioned above requires no special installation space for an independent tone wheel, and it is possible to detect the rotational speed at the constant velocity joint section. Therefore, it is possible to combine the constant velocity joint with the rolling bearing unit having a reduced axial size to detect the rotational speed of the vehicle wheel.

What is claimed is:

1. A tone wheel built-in constant velocity joint comprising a housing having an end portion, a middle portion, an inner peripheral surface formed with an axially long engagement groove or recess and an outer peripheral surface formed with an anchoring groove, a rotatable shaft inserted into the housing and having an outer peripheral surface, a rotation transmitting member provided between the outer peripheral surface of the rotatable shaft and the engagement groove or recess of the housing, an inner ring fixedly fitted onto the middle portion of the housing to partly form a rolling bearing unit, and a boot made of a resilient material and having one end portion fixedly fitted onto the end portion of the housing, a stop ring engaged with the anchoring groove on the outer peripheral surface of the housing between the one end portion of the boot and the inner ring to prevent the inner ring from moving with reference to the housing, and a retaining ring fixedly fitted onto the stop ring, and part of the retaining ring formed with a detected portion for a tone wheel having a circumferential property changing alternately with a uniform interval.

2. A tone wheel built-in constant velocity joint comprising a housing having an end portion, a middle portion, an inner peripheral surface formed with an axially long engagement groove or recess and an outer peripheral surface formed with an anchoring groove, a rotatable shaft inserted into the housing and having an outer peripheral surface, a rotation transmitting member provided between the outer peripheral surface of the rotatable shaft and the engagement groove or recess of the housing, an inner ring fixedly fitted onto the middle portion of the housing to cooperate with an outer ring with an end face to partly form a rolling bearing unit, the outer ring being fixed to a knuckle having a mount hole with an inner peripheral surface, and a boot made of a resilient material and having an outer peripheral surface and one end portion fixedly fitted onto the end portion of the housing, a stop ring having an outer peripheral surface and engaged with the anchoring groove on the outer peripheral surface of the housing between the one end portion of the boot and the inner ring to prevent the inner ring from moving with reference to the housing, and a tone wheel fixedly connected integrally to the housing or fixedly connected to the housing directly or through another member therebetween, the tone wheel having a portion formed with a detected portion having a circumferential property changing alternately with a uniform interval, the portion being disposed in the space defined by the outer peripheral surface of the stop ring and the outer peripheral surface of the boot, the inner peripheral surface of the mount hole of the knuckle and the end face of the outer ring.

* * * * *